United States Patent [19]

Smith

[11] Patent Number: 4,902,855

[45] Date of Patent: Feb. 20, 1990

[54] END SEAL FOR SPLICE CLOSURE

[75] Inventor: Russell P. Smith, Georgetown, Tex.

[73] Assignee: Minnesota Mining and Manufacturing Company, St. Paul, Minn.

[21] Appl. No.: 262,278

[22] Filed: Oct. 25, 1988

[51] Int. Cl.$^4$ ............................................. H02G 15/04
[52] U.S. Cl. .................................... 174/77 R; 174/87; 174/93
[58] Field of Search .................. 174/77 R, 87, 91, 92, 174/93

[56] References Cited

U.S. PATENT DOCUMENTS

| | | | |
|---|---|---|---|
| 2,304,167 | 12/1942 | Hayes | 174/77 R |
| 3,557,299 | 1/1971 | Dienes | 174/77 R X |
| 3,728,467 | 4/1973 | Klayum et al. | 174/77 R X |
| 3,848,074 | 11/1974 | Channell | 174/77 R X |
| 4,341,922 | 7/1982 | Bossard et al. | 174/92 |
| 4,488,013 | 12/1984 | Ziegler | 174/51 X |
| 4,501,927 | 2/1985 | Sievert | 174/93 |

FOREIGN PATENT DOCUMENTS

| | | | |
|---|---|---|---|
| 507657 | 9/1930 | Fed. Rep. of Germany | 174/92 |
| 2550097 | 5/1977 | Fed. Rep. of Germany | 174/92 |

*Primary Examiner*—Morris H. Nimmo
*Attorney, Agent, or Firm*—Donald M. Sell; Walter N. Kirn; John C. Barnes

[57] ABSTRACT

Splice closures can be readily sealed by wrapping the cables with a mastic and then forming an end for a performed closure by placing the halves of a split ring about the mastic and drawing the halves closed by a toggle fastener including an arcuate leg connected at one end to one half and joined intermediate the fulcrum and handle of a lever supported on the other half to squeeze the mastic about the cables as the halves are drawn together. The closure may be sealed to the ring by a rolling O-ring.

11 Claims, 4 Drawing Sheets

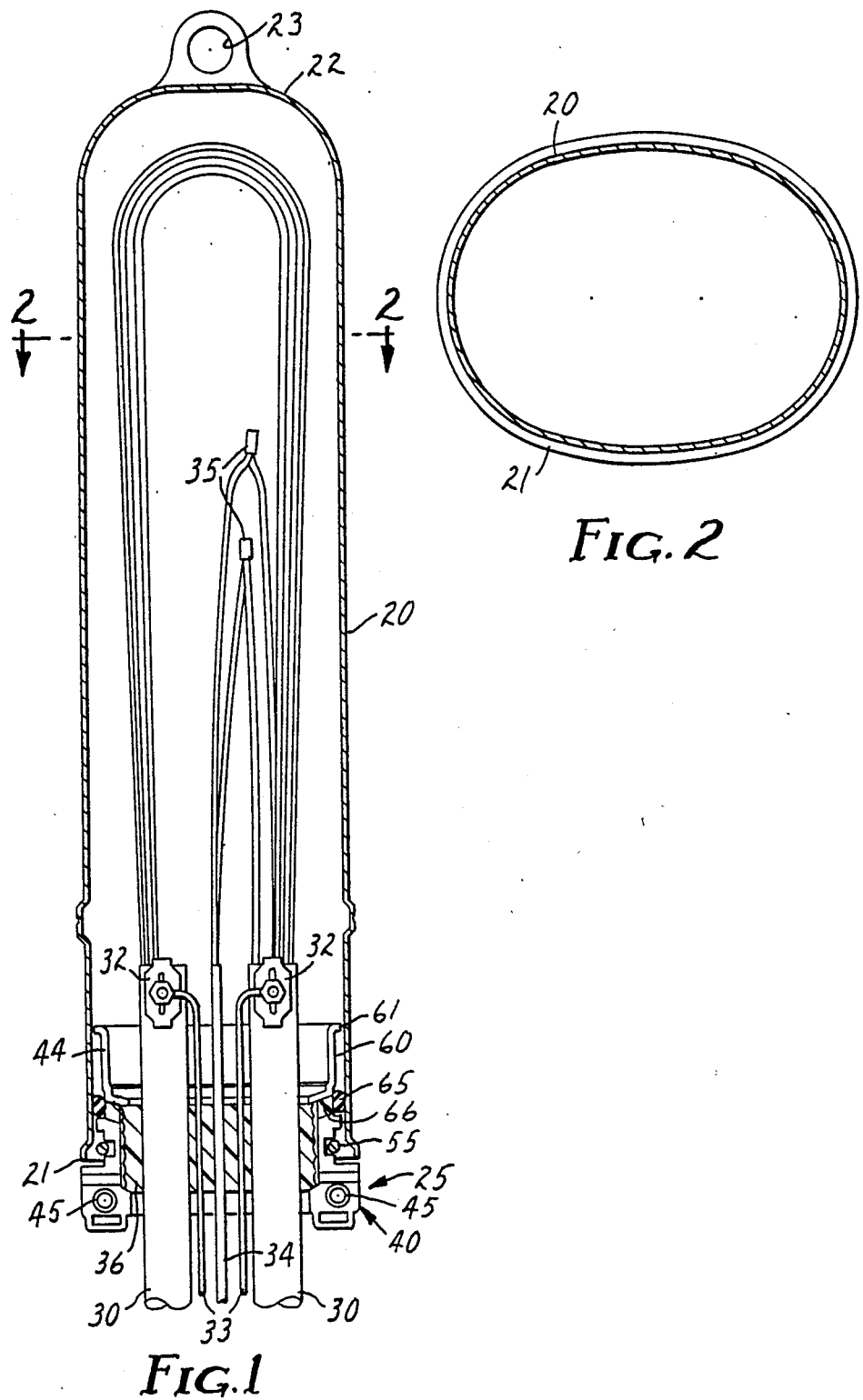

END SEAL FOR SPLICE CLOSURE

BACKGROUND OF THE INVENTION

1. Field of the Invention

This invention relates to end closures for cable splice closures to provide an hermetic seal at the cable entrance and in one aspect to an improved seal for a pedestal splice closure where service wires are spliced to selected wire pairs of a loop of telephone cable.

2. Description of the Prior Art

Providing a seal for a cable splice closure which will provide a high degree of protection to the spliced area of the cable against moisture entry, dust, bugs. etc. and still have a closure which is easy to apply and is reenterable is an area of inventive endeavor challenged by many.

There have been prior closures which have used mating collars to define a preformed band about the cables and there have been closures which provided the degree of environmental sealing necessary. There has not been a closure which could provide the desired sealing, repeated reentry and not require tools to allow reentry, or tools to create the seal in a pedestal type splice closure.

An early pedestal closure is shown in U.S. Letters Pat. No. 3,557,299 which discloses a loop formed in a cable with the loop fitted into a molded base through a retainer to which the cable portions are fixed by clamps. A seal is formed about the cable portions by an elastic sleeve clamped about the cables. A channel is formed about the sleeve and is filled with a mastic to assist in forming the seal about the cables created by the compression plates. The drop wires enter through perforations in the base and are held in place by pack nuts. The protective cap or dome for the closure was sealed to the base by an abutting O-ring and a ring clamp.

A pedestal closure which is sealed by an encapsulating splice housing is shown in U.S. Letters Pat. No. 4,488,013. The housing in this patent is adapted to be filled with the sealant and a seal is formed about the legs of the cable by a stepped or tapered lower portion formed of sufficiently soft material to be cut to fit the two legs of the cable. There is no teaching of reentry.

U.S. Letters Pat. No. 4,341,922 is directed to a strain-relief brace for a cable splice case and discloses an end seal for forming a seal with a cable at the end of a closure. This seal description teaches the use of strips of mastic tape convolutely wound about the cables at the required locations and to the required thickness, sufficiently to slightly overfill the designated spaces within the cable collars. The collars are then applied and split half washers are used at the ends. The collar halves are drawn together by fasteners. The seals formed as described require considerable time and force to get the mastic to flow to the point of sealing the ends and having the washers bow or bulge under the force of the surplus mastic. The use of the bolt type fasteners and threaded sleeves require additional tools and time to prepare an effective seal.

Other prior art includes the closure where the cables and drop wire or service wire and ground wires are wrapped with the mastic tape. A plastic covering is then placed about the mastic tape. A molded dome is placed over the coiled wire and splices and then a prestretched core-supported rubber-like sleeve is placed over the end of the dome, which is placed on or near the wrapped mastic. The support core is then removed to shrink the sleeve tightly over the end of the dome and the covering of the mastic. The sleeve must be cut and removed to afford reentry and subsequently replaced following any service work on the splice.

The use of an O-ring to seal one end of a cylindrical sleeve of resilient or elastic material is shown in U.S. Letters Pat. No. 4,501,927. In forming a seal according to this invention the O-ring and the sleeve are applied over the cables and the cables are spliced. Thereafter the sleeve is rolled along the cable to a position over both O-rings and over the spliced area of a cable. This is not a teaching of applying an O-ring seal to one end of a closure which is elliptical in section or at said one end.

The present invention affords an efficient protective seal for one end of a splice closure and is specifically adapted to sealing a pedestal splice in a loop of transmission cable to bring in a service wire. The resulting splice closure is reenterable and can again be sealed without tools or additional materials.

SUMMARY OF THE INVENTION

The present invention is directed to an improved splice closure end seal and is adapted for use on pedestal dome-like closures to effectively seal the closure end and allow reentry. The end seal of the present invention comprises a pair of collars adapted to be placed about the cables in a location of the placement of the end of the closure. The pair of collars when placed together and held by fastener means define an elliptical peripheral area over which the end of the closure is adapted to be placed. An O-ring is placed in a groove in the outer peripheral area. The groove extends about the outer peripheral surface of the collars and has a width equal to or greater than the circumference of the cross-section of the O-ring, allowing the O-ring to roll at least once as a closure is placed over said outer peripheral area sufficient to cover the groove. The diameter of the O-ring in section exceeds the normal spacing between the inside surface of the closure and the bottom surface of the groove extending about the periphery of the collars. In a pedestal closure the closure is a domed closure with the end opposite said one end closed.

The collars are split halves of a collar and comprise a pair of substantially identical halves or shells which mate to form the collar. One of the shells however is formed with at least one alignment pin fitting in an alignment opening, or bore, in the other. A two piece toggle fastener is placed at each end of the collar halves to draw the ends of the same together and drive the alignment pins into the openings. One piece of the toggle fastener is arcuate lengthwise and defines a resilient member of maintaining a continuous bias on the fastener to urge the ends of the collar shells into mating engagement.

The collar shells are preferably provided with internal faces which are formed with ridges and grooves to receive a mastic material therein, which define a surface to restrict movement of the collars in relationship to the mastic material.

Passages are formed in the collar in the area of one edge of the peripheral groove in which the O-ring is placed to afford means for sealing the collar shells at the area of the O-ring where the doomed closure is seated by the O-ring.

BRIEF DESCRIPTION OF THE DRAWING

The present invention will be further described with reference to the accompanying drawing, wherein:

FIG. 1 is a vertical sectional view of a pedestal splice closure showing the dome-closure fitted over a collar placed over the mastic wrapped about the cable portions, service wire and ground wires;

FIG. 2 is and end view of the closure;

DETAILED DESCRIPTION OF THE INVENTION

Figure 3:
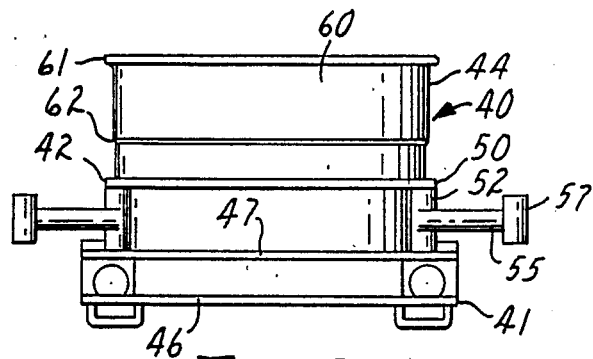
FIG. 3 is a side elevational view of one half of the collar.

The present invention will be described with reference to the accompanying drawing wherein like reference numerals refer to like parts throughout the several figures.

The closure structure of the present invention is hereinafter described with reference to a preferred embodiment which includes a closure member 20 in the form of a dome having a open end 21 and a closed end 22, terminating with an eye 23 to receive a hook or finger to apply axial force to the closure 20 to separate it from a collar 25. The closure 20 is elliptical in cross-section as illustrated in FIG. 2.

The closure is formed to fit about a loop in a transmission cable where it is desired to make a service connection to a buried communications line for extending service into a new subscriber or change an existing splice in the cable. The loop is a convenient way to obtain access to a pair of the wires in a cable. The outer sheath of the cable 30 is removed, together with the conductive shield to expose the individual wire pairs in the cable. The cable is then folded in the area of the opening in the sheath and ground connectors 32 are connected to the shield at the severed ends and ground wires 33 are attached thereto to connect the shield across the opening and maintain the shield at ground potential. Pairs of the wires in the cable are cut and spliced to the one or more pairs of wires in the service line 34 by connectors 35. The cable 30, the ground wires 33 and the service wire 34 are then wrapped by a mastic material 36 provided in the form of a wide mastic tape which is placed about the outer sheaths of the cables which are convolutely wound by the tape thereabout to a required thickness to slightly exceed the inside area of the collar 25 to be placed thereabout. A suitable tape is an uncured compounded butyl rubber product such as No. 7500 Mastic, sold by General Sealants, Inc., City of Industry of Calif.

Figure 4:
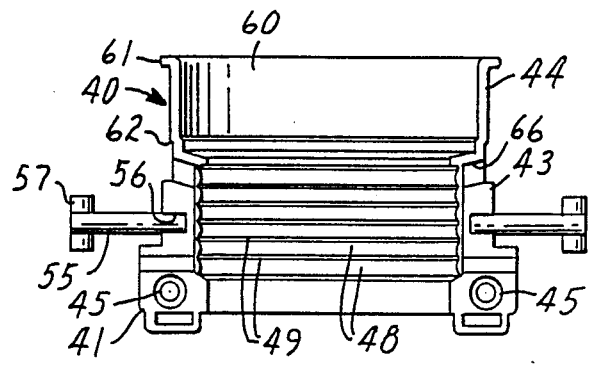
FIG. 4 is a side elevational view of the collar half of FIG. 3, showing the other side.

The collar 25 illustrated in FIGS. 4-10 is elliptical in transverse section and is split to permit assembly after the splicing activity is completed. The collar 25 comprises two molded halves or shells which are drawn together in mating position by two toggle fasteners. The shells are molded of polyester or blended polyester and comprise a first qr female shell 40 (see Figs. 3 and 4) having a base portion 41, a body portion 42 and an upperside or end portion 44. The base portion 41 has a pair of spaced flanges 46 and 47 separated by a semi-elliptical wall. The flange 46 has a pair of U-shaped mounting brackets depending beneath each end thereof. On the inside or opposed mating face 43 of the base 41 the wall is radial to the elliptical shape and as shown in FIG. 4 is formed with symmetrical openings 45 at each end. The body portion 42 is provided with a series of parallel ridges and grooves 48 and 49 respectively, which extend about the inner peripheral surface of the semi-elliptical shell 40. The outer surface of the body portion 42 has a flange 50 disposed in parallel spaced relationship to the upper flange 47. The body is provided with a boss on each end of flange 47 and on each end of flange 50 which are formed with axially spaced arcuate recesses, see FIG. 7, directed away from the mating face 43 of the shell 40 to form a gudgeon 51 for receiving the ends of a journal 52 on one end of an arm 55 making up part of the toggle fastener. The space between the bosses on the flanges 47 and 50 provide a groove 56 at each end to receive the arm 55 as it is drawn past the mating edges of the shells. The portion 44 (see FIGS. 3 and 4) of the shell 40 is on the upper side of the body and is defined by an arcuate or semi-elliptical wall 60 which has an outwardly turned upper edge 61, which edge 61 and the flange 50 define a groove therebetween for receiving an O-ring 65. The groove also has a stepped edge 62 adjacent the flange 50 where the circumference of the groove is reduced. Small channels 66 are formed in the face 43 communicating between the interior face of the body portion 42 and the O-ring groove. The channels of this shell mate with similar channels in the mating second or male shell 70 to afford a passage for mastic to complete the seal between the inner periphery of the shells and the inner periphery of the O-ring following assembly of the same.

Figure 5:
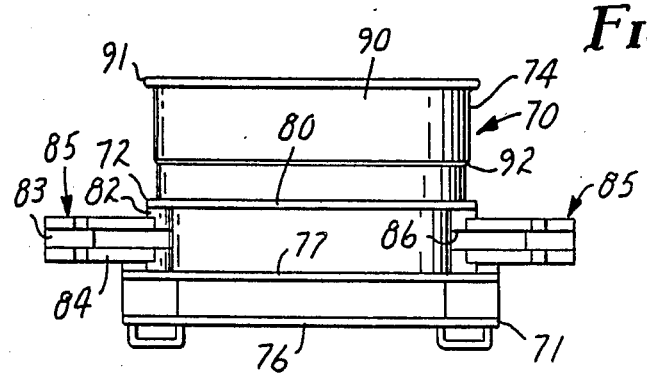
FIG. 5 is a side elevational view of the other collar half.
Figure 6:
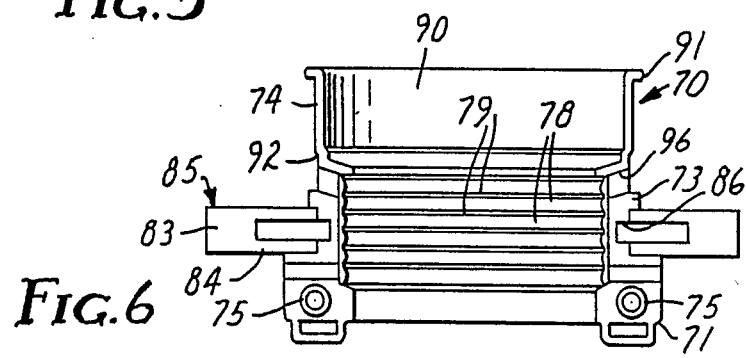
FIG. 6 is a side elevational view of the other collar half, showing the other side thereof.
Figure 7:
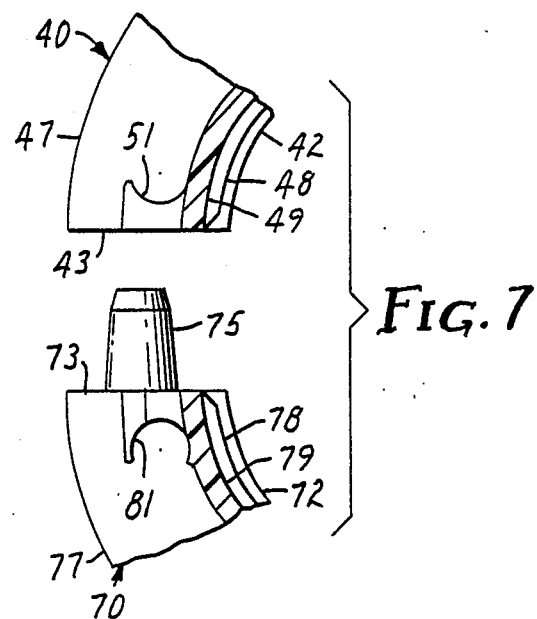
FIG. 7 is a fragmentary detail sectional view of the ends of the collars before they are drawn together.
Figure 11:
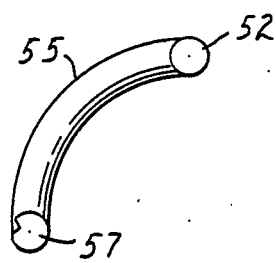
FIG. 11 is a plan view of the arcuate arm of a toggle fastener.
Figure 13:
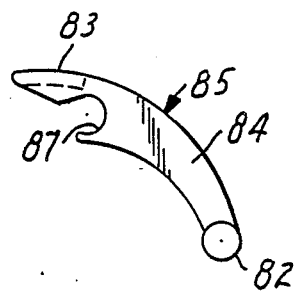
FIG. 13 is a bottom view of the lever of the toggle fastener.
Figure 12:
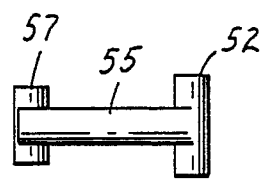
FIG. 12 is a front elevational view of the arm of FIG. 11.
Figure 14:
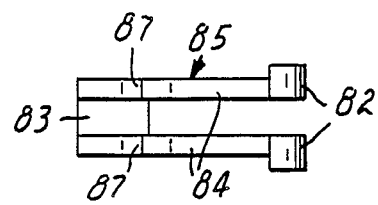
FIG. 14 is a side view of the lever of FIG. 13.

The shell 70 is formed similar to the shell 40, see FIGS. 5, 6 and 7. The shell 70 comprises a base portion 71, a body portion 72 and an upper side or end portion 74. The base portion 71 has a pair of spaced flanges 76 and 77 separated by a semi-elliptical wall. The flange 76 has a pair of U-shaped mounting brackets depending beneath each end thereof, which, together with the brackets on the flange 46 of the shell 40 are shaped to receive the arms of a bracket for mounting the collar on a post or building. On the inside or opposed mating face 73 of the base 72 the wall is radial to the elliptical shape and as shown in FIG. 6 is formed with symmetrical projecting alignment pins 75 at each end thereof which pins are formed to fit in the openings 45. The body portion 72 is provided with a series of parallel ridges and grooves 78 and 79 respectively, which extend about the inner peripheral surface of the semi-elliptical shell 70. The outer surface of the body portion 72 has a flange 80 disposed in parallel spaced relationship to the flange 77. The body is provided with a boss on each end of flange 77 and on each end of flange 80 which are formed with axially spaced arcuate recesses, see FIG. 7, directed away from the mating face 73 of the shell 70 to form a gudgeon 81 for receiving the ends of a journal 82 on one end of a lever 85 making up the second part of the toggle fastener, see FIGS. 13 and 14. The extent of the arc making up the gudgeons 81 is greater than the arc making up the gudgeon 51 as it is preferred that the lugs on the journal 82 be secured more permanently in the shell 70 allowing ease in assembly of the collar about the cables 30 and the mastic 36. The space between the bosses on the flanges 77 and 80, see FIGS 5 and 6, provide a groove 86 at each end to receive the arm 55 as it is pivoted and drawn past the mating edges 43 and 73 of the shells. The upper portion 74 of the shell 70 is defined by an arcuate or semi-elliptical wall 90 which has an outwardly turned upper edge 91, which edge and the flange 80 define a groove therebetween for receiving the O-ring 65. The groove also has a stepped edge 92 adjacent the flange 80 where the circumference of the groove is reduced. Small channels 96 are formed in the face 73 communicating between the interior face of the body portion 72 and the O-ring groove adjacent the flange 80.

The arm 55, see FIGS. 8, 9, 10 and 11, of the toggle fastener is formed of resilient material such as nylon and is arcuate or bowed generally corresponding to the outer periphery of the body of the shells. The arm 55 has the journal or pin 52 at one end and a similar journal or pin 57 at the other end. The lever 85, see FIGS. 8, 9, 10, 13 and 14, is a bifurcated member having a handle or pressure receiving plate member 83 at one end of two projecting parallel spaced arcuate arms 84 and the lugs 82 projecting, one from each arm 84 at the distal end. Intermediate the ends of the lever and formed in the arms are recesses 87 for receiving and pivotally supporting the lugs of the pin 57 on the arm 55.

Figure 8:
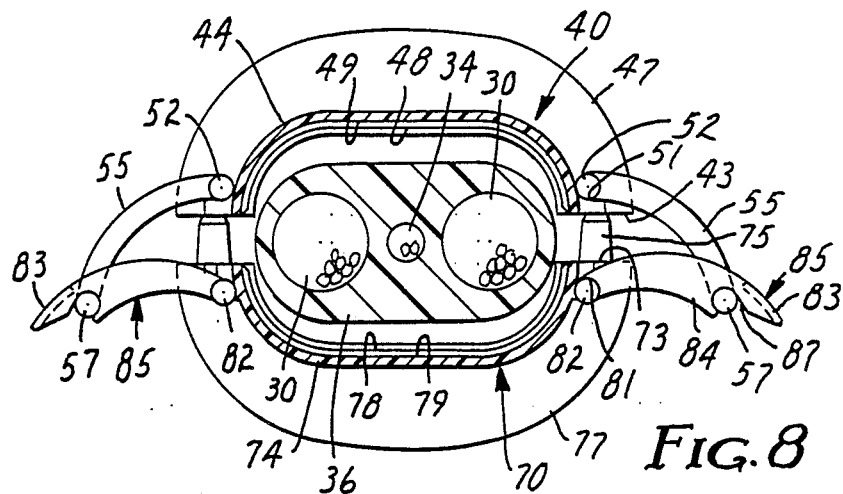
FIG. 8 is a cross-sectional view of the collar halves placed about a pair of cable portions wound with a mastic with the toggle fasteners joined to draw the ends of the collars together.
Figure 9:
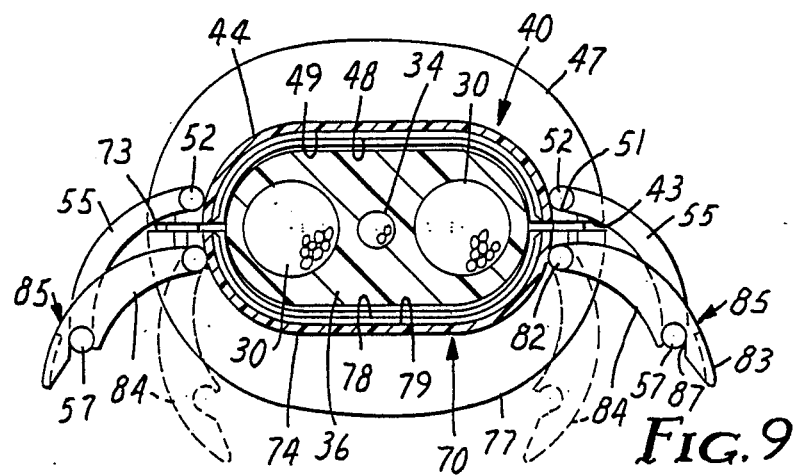
FIG. 9 is a cross-sectional view corresponding to FIG. 8 showing the fasteners being closed with one arm thereof being straightened.
Figure 10:
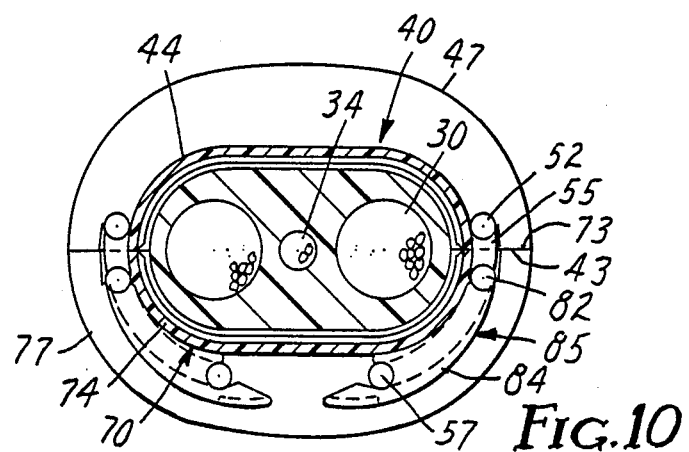
FIG. 10 is a cross-sectional view of the collars drawn about the cables and mastic material with the fasteners closed.

After the mastic is wound about the wires, the collar shell 40 is placed against one side of the mastic and the shell 70 is positioned on the opposite side and aligned with the shell 40. The levers 85 are mounted on the shell 70 in the gudgeons 81 and the arms 55 are mounted with the pins 57 in the recesses 87. The pins 52 may then be readily placed in the gudgeons 51 as shown in FIG. 8. The levers 85 are then pivoted about the axis of lugs 82 toward the body portion 72 of the shell 70 as shown in FIG. 9 drawing the shells 40 and 70 together and driving the pins 75 into the alignment openings 45 in the shell 40. As the levers are pivoted the arms 55 are straightened against the resilience of the material placing a compressive force on the mastic. When the levers 85 reach the position shown in FIG. 10 the mastic has been allowed to flow under the spring pressure of arm 55 to close any openings and fill the grooves 49 and 79 until the opposing faces 43 and 73 of the shells mate.

Referring back to FIG. 1, it is seen that a small amount of the mastic 36 is driven into the channel formed by the channels 66 and 96 or a small amount is placed in the channels before the toggle fastener is closed. The mastic will then contact the inner surface of the O-ring 65. The dome closure 20 is driven down over the collar 25, causing the O-ring 65 to be rolled from a position adjacent the edges 61 and 91 of the collar shells 40 and 70, over the stepped area to the position illustrated adjacent the lower part of the peripherally extending groove near the flange 50 and 80 of the shells. This distance of movement is equal to one turn of the O-ring 65 causing it to be turned inside out and urged to return to it's normal position, except that it is deformed by being compressed between the inner surface of the closure 20 and the outer surface of the walls 60 and 90 defining the base of the peripheral groove about the collar.

The rolling O-ring 65 and the mastic which is driven into the channels 66 and 96 complete an effective hermetic seal in the closure, which will restrict the entry of moisture, dust, bugs etc.

Having described the invention with reference to a preferred embodiment, it is to be understood that portions of the device may be changed from that of the disclosure, and portions may be deleted, without departing from the spirit or scope of the invention as set out in the depending claims.

I claim:

1. An end seal for an end of a splice closure formed as a hollow tubular member which is elliptical in cross section and has at least one open end for receiving cables to be spliced together, said seal comprising:
   collar means adapted to be placed about the cables in a location corresponding to a said end of the closure, said collar means having an elliptical shape in transverse cross section and having means defining a peripheral groove about the outside perimeter of said collar means, and
   an O-ring placed in said groove, said O-ring having an inside diameter to fit snugly against the bottom of said groove and
   said groove having a width sufficient to accommodate one rotation of said O-ring.

2. An end seal according to claim 1 wherein said collar is formed of a pair of shells which when placed together define an elliptical ring adapted to be placed about a pair of cable portions,
   fastener means joined to the ends of said shells for urging said ends into engagement with each other and for maintaining a biasing force on said ends.

3. An end seal according to claim 2 wherein said fastener means comprises an arcuate arm pivotally connected at one end adjacent one end of one of said pair of shells, a lever pivotally connected at one end to one end of the other shell of said pair of shells, and another end of said arm being connected pivotally intermediate the ends of said lever whereby pivotal movement of said lever toward said other of said pair of shells will draw said ends of said pair of shells together.

4. A sealing collar for use about a pair of cables which have been wrapped convolutely with a mastic tape material, said collar comprising:
   a pair of shells which when placed together define a ring, each said shell having a body portion with an inner surface formed to engage a mastic surface, means on each shell for aligning each said shell with the other of said shells, and each shell having at least one end, and
   toggle means affixed to said at least one end of each of said shells for drawing said ends into engagement with each other.

5. A sealing collar according to claim 4 wherein said toggle means comprises an arm having two ends and pivotally connected at one end adjacent said end of one of said pair of shells, a lever having two ends and pivotally connected at one end to the adjacent end of the other shell of said pair of shells, and said other end of said arm being connected pivotally intermediate the ends of said lever whereby pivotal movement of said lever toward said other of said pair of shells with draw the adjacent ends of said pair of shells together.

6. A sealing collar according to claim 4 wherein the internal faces of the body portions are formed with ridges and grooves to receive a said mastic material and will restrict movement of the collar in relationship to the mastic material.

7. A sealing collar according to claim 5 wherein said arm is resilient and arcuate generally like the periphery of said ring, whereby pivotal movement of said lever will apply a straightening force on said arm for applying a compressive force on said mastic material as said toggle means draws said adjacent ends toward each other.

8. A sealing collar for use about a pair of cables which have been wrapped convolutely with a wide mastic tape material which wrapping has resulted in an elliptically shaped volume of mastic material, said collar comprising:

a pair of shells which when placed together define an elliptical ring, each said shell having a body portion with an inner surface formed to engage a mastic surface, a base portion on one side of said body portion having means for aligning said shell with the other of said shells, an end portion on the other side of said body portion, and opposite ends, and toggle fastener means joined to said ends of said shells for urging said ends of one shell into engagement with the ends of the other shell.

9. A sealing collar according to claim 8 wherein said toggle fastener means comprises an arcuate arm having two ends and pivotally connected at one end adjacent one said end of one of said pair of shells, a lever having two ends and pivotally connected at one end to an adjacent end of the other shell of said pair of shells, and the other end of said arm being connected pivotally intermediate the ends of said lever whereby pivotal movement of said lever toward said other of said pair of shells will draw said ends of said pair of shells together.

10. A sealing collar according to claim 8 wherein said end portions of said shells are formed with groove means about their outer peripheries, said groove means being formed to accommodate an O-ring and said groove means having a width parallel to the axis of a said O-ring sufficient to afford the rolling movement of a said O-ring through one rotation.

11. A sealing collar according to claim 10 wherein channels are formed in aid shells communicating between the inner surface of said shells and said groove means.

* * * * *